Aug. 20, 1929.  E. A. WILLIAMS  1,725,238
ROTARY CUTTER
Filed July 30, 1928
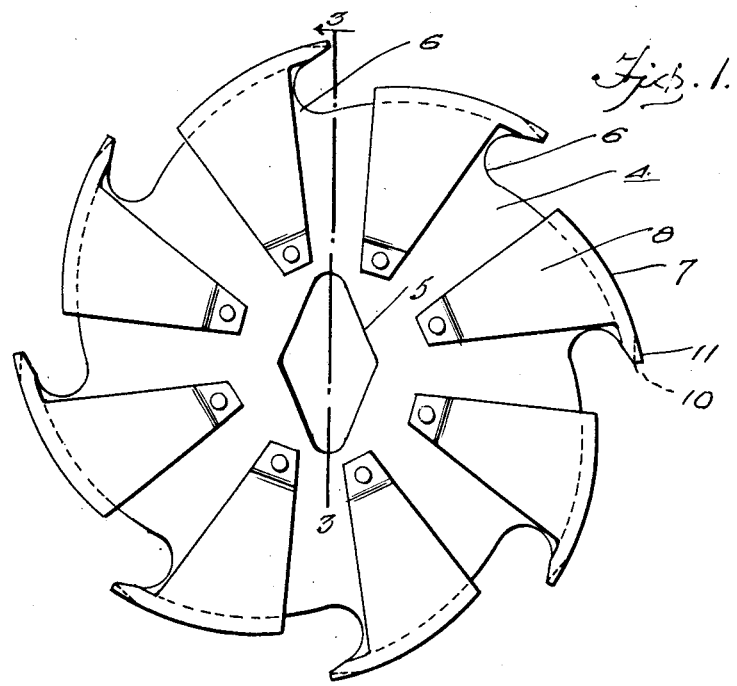
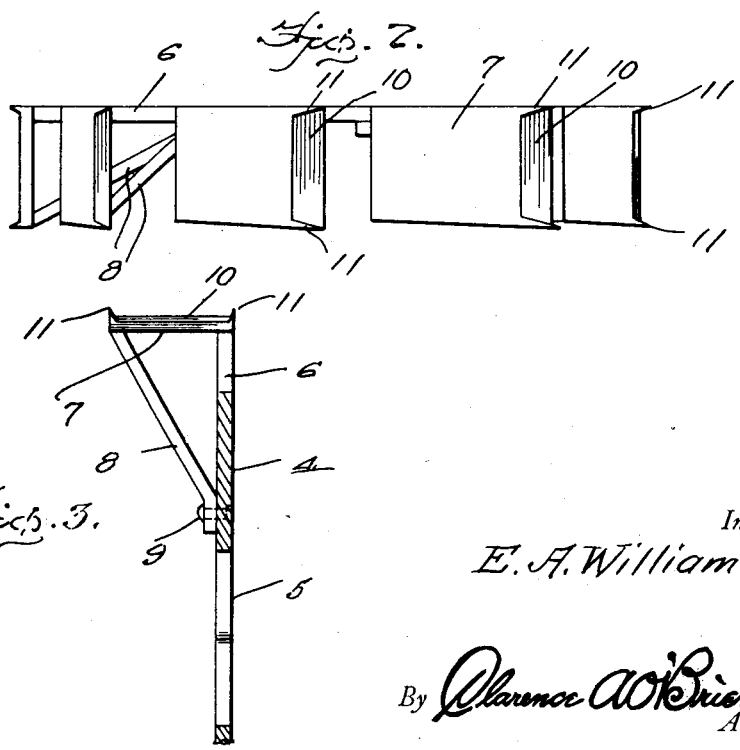
Inventor
E. A. Williams
By Clarence A. O'Brien
Attorney Patented Aug. 20, 1929.

1,725,238

UNITED STATES PATENT OFFICE.

ERNEST ALBERT WILLIAMS, OF ELYRIA, OHIO.

ROTARY CUTTER.

Application filed July 30, 1928. Serial No. 296,337.

This invention relates broadly to the art of woodworking, and has more particular reference to a rotary cutter such as is constructed for dadoing, cutting, rabbeting and grooving across or with the grain.

More specifically stated, the invention has reference to a disk-like plate whose periphery is notched and provided with outstanding cutters disposed at right angles to one face of the plate, the cutters and notches being disposed in alternating relation to facilitate the cutting operation.

The cutter is designed to run various kinds of moldings, and is characterized by clean cutting qualities, simplicity and lightness in weight, low cost of production, adaptability to the various operations for which it is intended in woodworking, facility in adjustment and reliability in operation.

Other features and advantages of the invention will become more readily apparent from the following description and drawings.

In the drawings:—

Figure 1 is a side elevational view of a rotary cutter constructed in accordance with the present invention.

Fig. 2 is a top plan view of Fig. 1.

Fig. 3 is a fragmentary vertical section taken approximately upon the plane of the line 3—3 of Fig. 1.

In carrying out the invention, I provide a flat disk-like plate 4, whose central portion is provided with a diamond-shaped round or square opening 5 to permit it to be properly mounted on an arbor. This arbor hole or opening is stamped so that it centers over saw mandrels on a large cutter. As before intimated, the peripheral edge of the blade is formed with circumferentially spaced notches 6, the crotch portion of which is located to underlie an extending edge portion of each blade-like cutting element 7.

These blade-like elements are disposed at right angles with respect to the left-hand face of the disk as shown in Fig. 3, and are provided at their outer edges with integral diagonal bracing arms 8, spot welded or riveted to the body as indicated at 9. In side or face view in Fig. 1, it will be observed that these blade-like elements 7 are disposed substantially at a tangent to the circumferential edge of the plate. They therefore have the appearance of a series of circumferentially spaced cutting feet. It will be noted that the ends of the blades which overlie the crotch portions of the notches are ground on their inner ends, beveled on their outer sides as at 10, to provide cutting edges. The bevels 10 are so disposed as to form a pair of spurs 11 on opposite longitudinal sides.

A cutter of this type can be operated on light saw tables, electric hand saws, and is easily sharpened and cuts clean. The spurs leave a clean cut in dadoing, cutting, grooving across or with the grain, and may be omitted when the cutter is used for planing.

By leaving the spurs off and using the cutter on the saw table, it would convert the same into a planer, and by using the cutter on electric hand saw will produce a hand plane or jointer. These cutters can be made at a big saving in cost, compared to any now in use. They are capable of being stamped from a punch press for a cost of about seven cents each, and may be made to vary in width from $\frac{3}{16}$ of an inch to four inches with the diameter in proportion to the size of the electric hand saws and saw tables.

It is thought however, that the particular construction, advantages, and operation of the invention will be clear to persons skilled in the art to which the invention relates. Therefore, a more lengthy description is regarded unnecessary.

Minor changes in shape, size, and materials coming within the field of invention claimed, may be resorted to if desired.

Having thus described my invention, what I claim as new is:—

A rotary cutter comprising a flat disk-like plate having a centrally located diamond-shaped arbor opening, having peripheral circumferentially spaced notches, said body having peripheral extensions projecting at right angles to one side edge and disposed substantially tangentially with respect to the circumference, corresponding end portions of said extensions being beveled to provide cutting edges and spurs, the last named end portions overlying the crotch portion of the notches.

In testimony whereof I affix my signature.

ERNEST ALBERT WILLIAMS.